ly parallel to the rotation axis of the impeller. The first wall portion has a substantially semi-cylindrical shape, whereas the second wall portion has a combined substantially semi-elliptical and semi-conical shape.

United States Patent [19]
Morris

[11] Patent Number: 5,084,236
[45] Date of Patent: Jan. 28, 1992

[54] CONVERGING SPOUT OUTLET NOZZLE ON AN OFFSET PUMP CASING

[75] Inventor: Allen L. Morris, Shaler, Pa.

[73] Assignee: Westinghouse Electric Corp., Pittsburgh, Pa.

[21] Appl. No.: 593,163

[22] Filed: Oct. 5, 1990

[51] Int. Cl.[5] .............................. G21C 15/14
[52] U.S. Cl. ................................. 376/361; 376/402
[58] Field of Search ............... 415/182.1, 203, 206, 415/212.1; 376/404, 406, 402, 361

[56] References Cited

U.S. PATENT DOCUMENTS

| | | | |
|---|---|---|---|
| 738,186 | 9/1903 | Halliwell | 432/221 |
| 3,339,490 | 9/1967 | Glass | 103/103 |
| 3,776,657 | 12/1973 | Ask | 415/53 |
| 4,930,944 | 6/1990 | Vanginhoven | 415/203 |

Primary Examiner—Brooks H. Hunt
Assistant Examiner—Frederick H. Voss

[57] ABSTRACT

A nuclear reactor coolant pump for pumping reactor coolant fluid in a reactor coolant system includes a casing, a rotor and an impeller. The casing defines an inlet nozzle for receiving the fluid, a peripheral outlet nozzle for discharging the fluid, and a passage interconnecting the inlet and outlet nozzles through which the fluid can flow from the inlet to outlet nozzle. The rotor extends axially through the casing and has an end disposed adjacent passage. The impeller is mounted to the end of the rotor and disposed in communication with the passage and offset axially from the outlet nozzle of the casing. The impeller is rotatable with the rotor for drawing fluid into the casing through the inlet nozzle and discharging fluid from the casing tangentially through the peripheral outlet nozzle after flow through the passage. The outlet nozzle is composed of first and second wall portions defined above and below a plane extending general 4 Claims, 5 Drawing Sheets

CONVERGING SPOUT OUTLET NOZZLE ON AN OFFSET PUMP CASING

BACKGROUND OF THE INVENTION

1. Field of the Invention

The present invention relates generally to nuclear reactor coolant system pumps and, more particularly, is concerned with a converging spout discharge nozzle on an offset pump casing.

2. Description of the Prior Art

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and reactor coolant pumps.

In one version of the reactor coolant system used in a nuclear power plant, the reactor coolant pumps are high inertia pumps hermetically sealed and mounted to the one steam generator in the respective coolant loop. Each pump has an outer casing, a central axially extending rotor rotatably mounted at its opposite ends by upper and lower bearings, and a canned motor located about the pump rotor between the upper and lower bearings. The motor includes a rotor section mounted for rotation on the pump rotor and a stator stationarily mounted to the casing about the rotor section.

Also, each pump includes an impeller mounted at one end of the pump rotor. The pump impeller rotates with the rotor, drawing reactor coolant water axially through a central inlet nozzle in the pump casing. The impeller also discharges the water tangentially through a peripheral outlet nozzle in the pump casing.

Typically, pump casing geometry is of the volute type in which the outlet nozzle is disposed in the plane of rotation of the impeller so that the path of the water flow from the impeller is directly to the outlet nozzle. However, volute casings have large diameters and are heavy and costly. In order to reduce pump space, cost, and weight, an offset type casing can be employed. In an offset casing, the output nozzle is offset axially from the plane of rotation of the impeller allowing a smaller casing diameter but requiring that the water must now flow along an axially-directed helical path before reaching the outlet nozzle.

A penalty in efficiency thus results when substituting an offset casing for a volute type, since the offset casing flow area is usually larger and not matched correctly with the area required by the fluid flow. This efficiency penalty is caused by dumping (mixing) losses in the main casing and flow contraction losses in the outlet nozzle.

Consequently, a need exists for improvement of the offset pump casing design so as to reduce the efficiency penalty associated therewith.

SUMMARY OF THE INVENTION

The present invention provides an offset pump casing designed to satisfy the aforementioned needs. The present invention relates to a modification of the generally cylindrical shaped conventional outlet nozzle of an offset pump casing to a composite of a semi-cylindrical and combined semi-elliptical and semi-conical shape, hereafter for sake of brevity referred to as a "converging spout" outlet nozzle, which reduces the contraction losses. The loss reduction increases pump hydraulic efficiency by changing the flow area at the pump casing outlet nozzle from an abrupt one to a smoother one.

Accordingly, the present invention is directed to a pump for pumping a fluid which comprises: (a) a casing defining an inlet nozzle for receiving a fluid, a peripheral converging spout outlet nozzle for discharging the fluid, and a passage interconnecting the inlet nozzle and the outlet nozzle through which the fluid can flow from the inlet nozzle to the outlet nozzle; and (b) an impeller disposed in the casing in communication with the passage and axially offset from the outlet nozzle of the casing, the impeller being rotatable for drawing fluid into the casing through the inlet nozzle and discharging fluid from the casing tangentially through the peripheral outlet nozzle after flow through the passage. The converging spout outlet nozzle of the casing is composed of first and second wall portions defined above and below a plane extending generally parallel to the rotation axis of the impeller. The first wall portion has a semi-cylindrical shape, whereas the second wall portion has a combined semi-elliptical and semi-conical shape.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
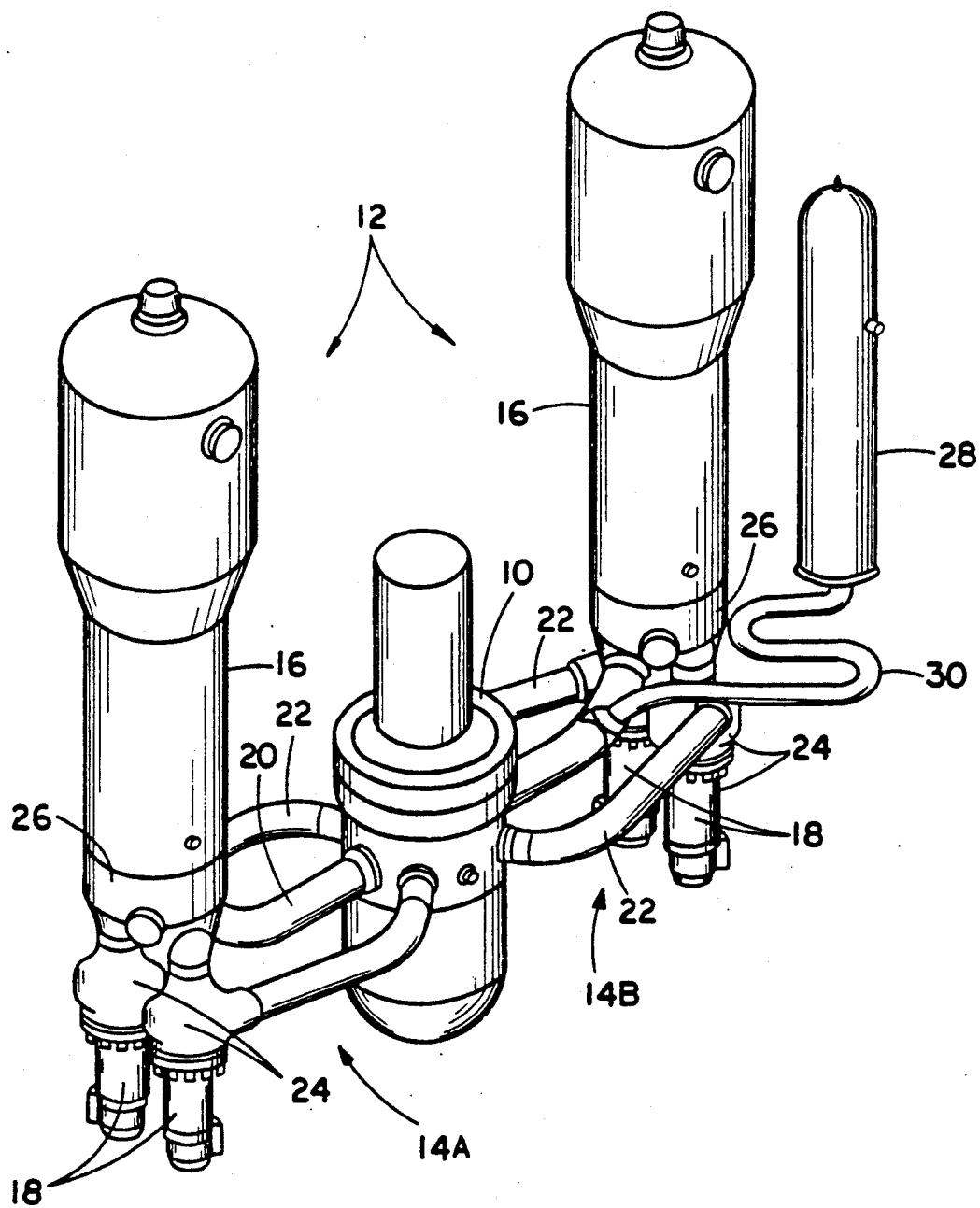
FIG. 1 is a perspective view of a prior art nuclear reactor core and coolant system connected thereto.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown a prior art nuclear reactor core vessel 10 and coolant system 12 connected thereto. The reactor coolant system 12 includes two coolant loops, generally indicated by the numerals 14A and 14B. Each of the coolant loops 14A, 14B includes a single steam generator 16, a pair of high inertia canned motor pumps 18, a single hot leg pipe 20, and a pair of cold leg pipes 22.

The pair of pumps 18 in each coolant loop 14A, 14B are hermetically sealed and mounted in inverted positions to the one steam generator 16 in the respective coolant loop. Each pump 18 has an outer casing 24 which is attached, such as by welding, directly to the bottom of a channel head 26 of the steam generator 16 so as to effectively combine the two components into a single structure.

The hot leg pipes 20 extend between and interconnect the reactor vessel 10 and the respective steam generators 16 for routing high temperature reactor coolant from the vessel 10 to the steam generators 16. The cold leg pipes 22 extend between and interconnect the pumps 18 and the reactor vessel 10 for routing lower temperature reactor coolant from the steam generators 16 via the pumps 18 back to the reactor vessel 10. Further, a pressurizer tank 28 is connected by a surge line 30 to one of the hot leg pipes 20.

Figure 2:
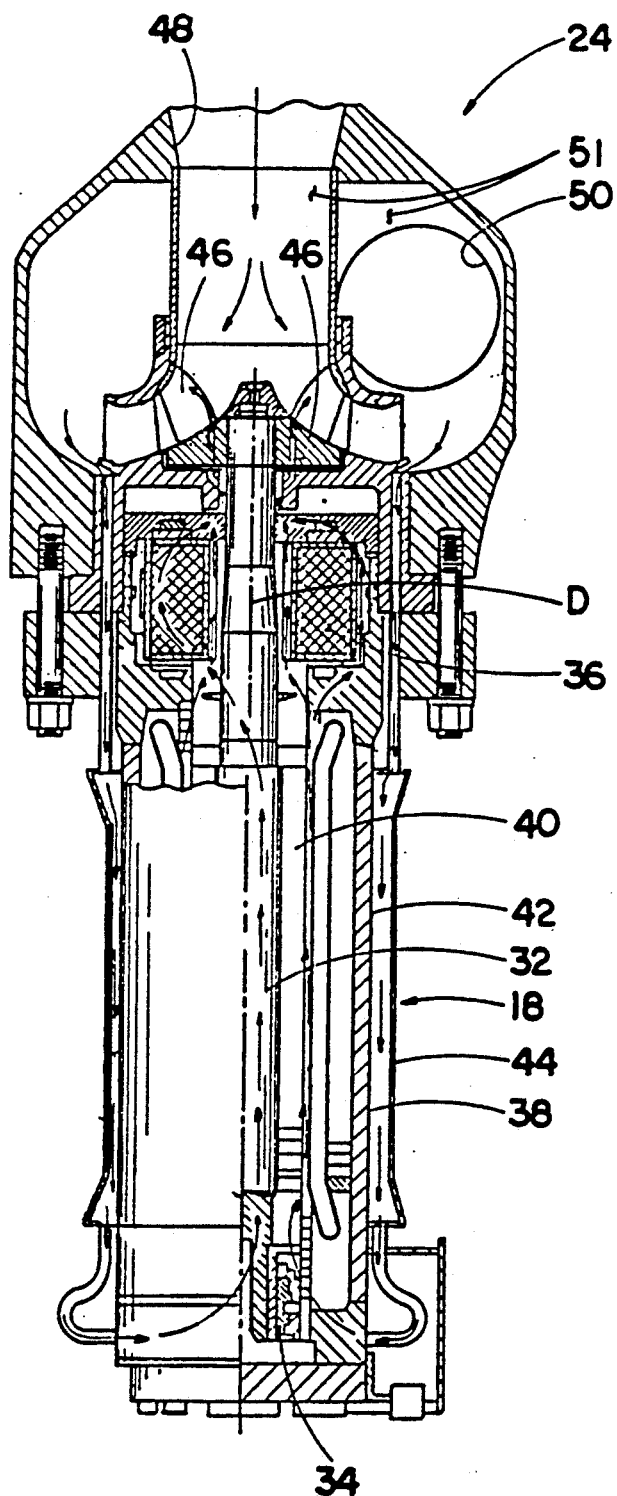
FIG. 2 is an enlarged elevational view, with portions broken away and sectioned, of one of the prior art reactor coolant pumps of the coolant system of FIG. 1.

Referring to FIG. 2, there is illustrated in greater detail one of the reactor coolant pumps 18. In addition to the outer casing 24, the pump 18 has a central rotor 32 extending axially through the casing 24 and rotatably mounted at its lower end by a pivot pad bearing 34 and at its upper end by a pivoted pad and thrust bearing combination 36. A canned motor 38 is located along the pump rotor 32 between the lower and upper bearings 34, 36. The motor 38 includes a rotor section 40 mounted for rotation on the pump rotor 32 and a stator 42 stationarily mounted about the rotor section 40. An annular cooling water jacket 44 surrounds the motor 38. Cooling coils (not shown) are also provided adjacent the upper thrust bearing 36 for cooling the same.

Also, at the upper end of the pump rotor 32 is mounted an impeller 46 which rotates with the rotor 32. The pump casing 24 has a central inlet nozzle 48 in its upper end, a tangential outlet nozzle 50 adjacent the upper end and a passage 51 connecting them in flow communication. The outlet nozzle 50 and impeller 46 are axially displaced from one another, thus the pump casing 24 is of the offset type.

Rotation of the rotor 32 and impeller 46 therewith draws water axially through the central inlet nozzle 48 in the pump casing 24 from the steam generator 16 and discharges water tangentially through the outlet nozzle 50 in the pump casing 24 after flow through the passage 51 of the casing 24 to the respective one of the cold leg pipes 22. In such manner, operation of the pumps 18 creates reduced pressure at their inlet nozzles 48 which sucks or draws water from the reactor vessel 10 via the respective hot leg pipes 20 to and through the steam generators 16 and creates increased pressure at their outlet nozzles 50 which pumps water through the cold leg pipes 22 back to and through the reactor vessel 10.

Offset Pump Casing Outlet Nozzle of Present Invention

Figure 4:
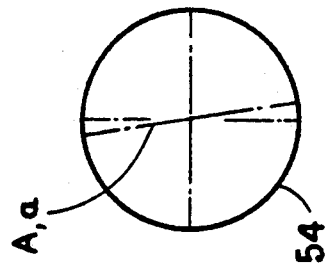
FIG. 4 is a diagrammatic representation comparing the cross-sectional shapes of spaced portions of the interior surface of the cylindrical shape outlet nozzle of the prior art offset pump casing of FIG. 3.
Figure 3:
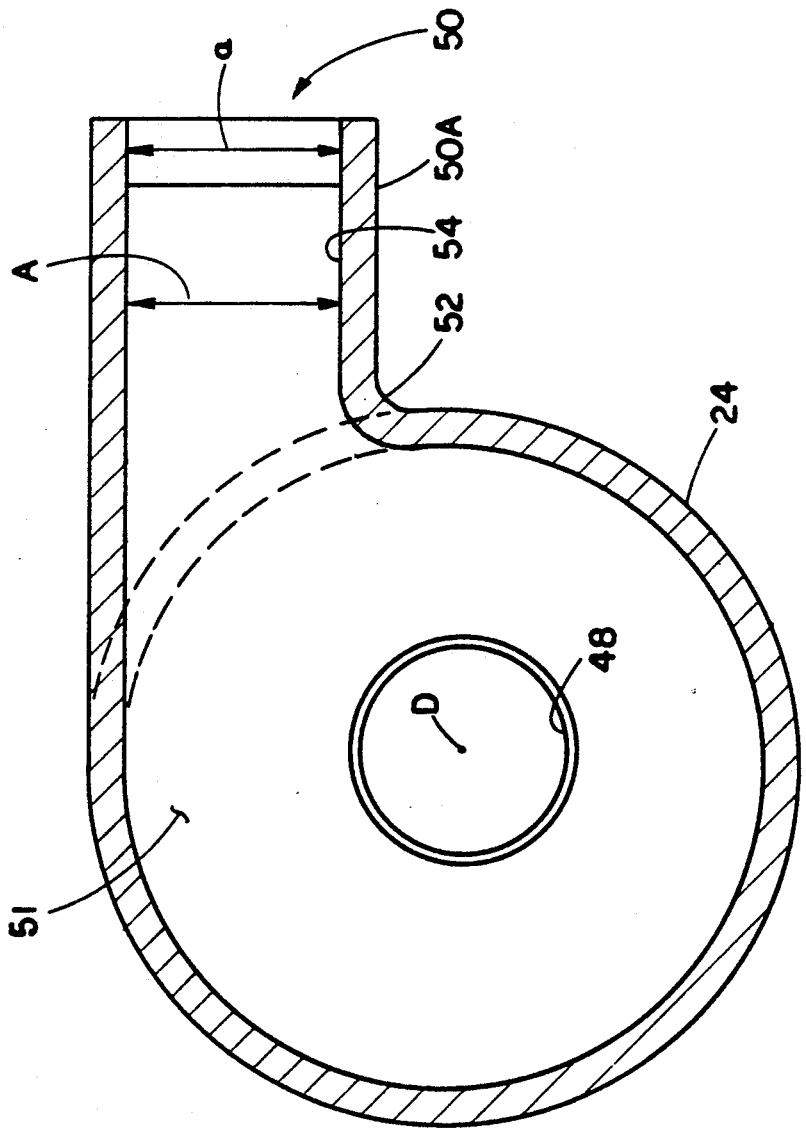
FIG. 3 is an enlarged cross-sectional view of a prior art offset pump casing having a cylindrical shape outlet nozzle.

Referring to FIG. 3, there is illustrated, in a somewhat simplified form, the offset pump casing 24 with the central inlet nozzle 48, peripheral outlet nozzle 50 and flow passage 51. The outlet nozzle 50 has a generally cylindrical construction which produces an abrupt change in flow area at location 52 where shorter portion 50A of the outlet nozzle 50 connects to the casing 24. FIG. 4 is a diagram showing generally the same circular cross-sectional shapes of spaced portions "A" and "a" of the interior surface 54 of the prior art cylindrical outlet nozzle 50 of the offset pump casing 24 of FIG. 3.

Figure 5:
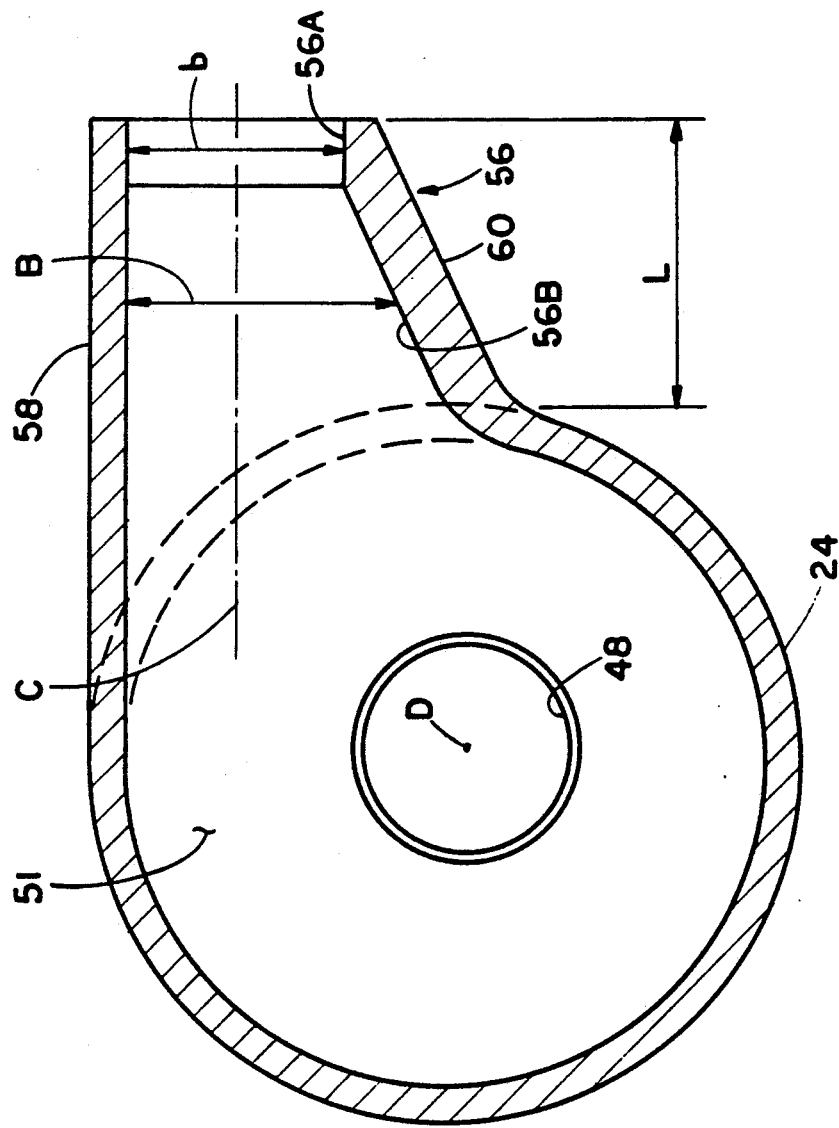
FIG. 5 is a view similar to that of FIG. 3 but of an offset pump casing having a converging spout outlet nozzle of the present invention.

Referring to FIG. 5, there is illustrated also in a somewhat simplified form, the offset pump casing 24 with the central inlet nozzle 48 but with its outlet nozzle modified to a converging spout outlet nozzle 56 of the present invention. The converging spout outlet nozzle 56 is composed of first and second wall portions 58 and 60 defined above and below an imaginary plane C extending generally parallel to and offset to one side of the rotation axis D of the impeller 46 (see FIG. 2). As can be determined from FIG. 5 together with the diagram of FIG. 6, the first wall portion 58 extends substantially tangentially to the casing 24 and has a substantially semi-circular or cylindrical shape, whereas the second wall portion 60 has a combined substantially semi-elliptical and semi-conical shape. The exit opening 56A of the outlet nozzle 56 has a substantially circular shape.

Figure 6:
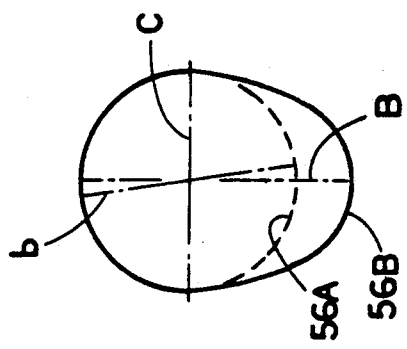
FIG. 6 is a diagrammatic representation comparing the cross-sectional shapes of spaced portions of the interior surface of the converging spout outlet nozzle of the offset pump casing of the present invention.

The semi-conical shape of the second wall portion 60 forms a cone angle of approximately twenty-five degrees. Reference literature reports that a maximum cone angle of thirty degrees was found in experimentation for pipe flows. This same maximum limitation on the cone angle also applies to the cone angle of the converging spout outlet nozzle 56 of the present invention. FIG. 6 is a diagram showing the semi-elliptical shape of portion "B" of the interior surface 56B of the converging spout outlet nozzle 56 and the circular shape of portion "b" of the interior surface 56B.

Figure 7:
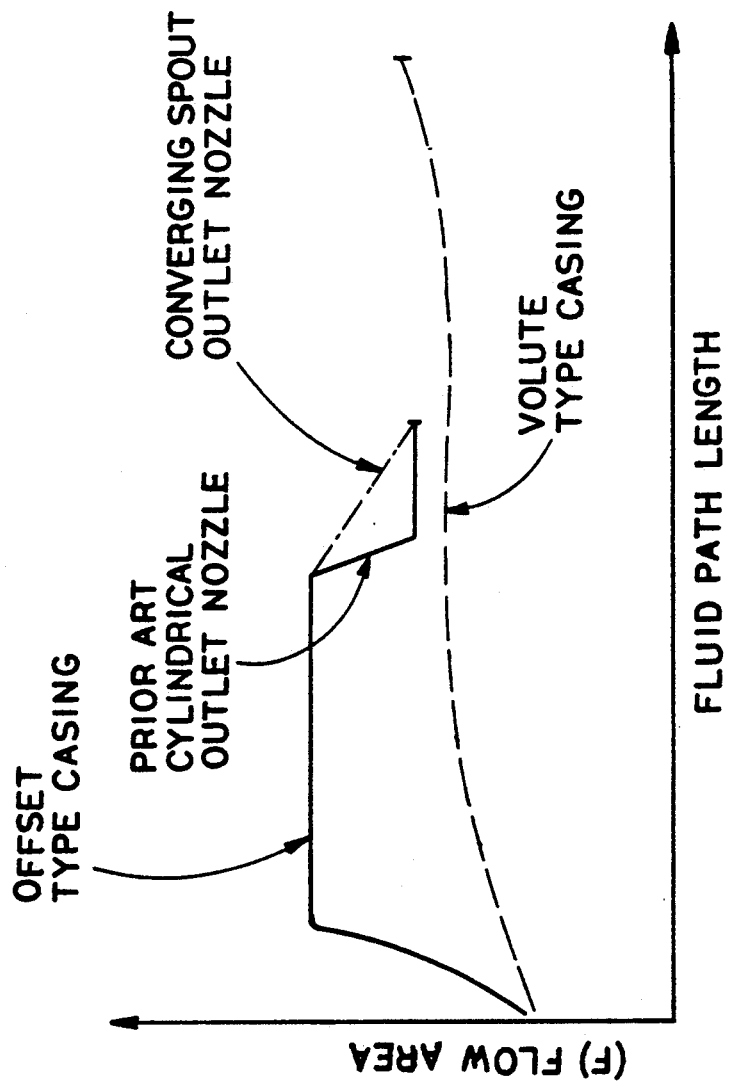
FIG. 7 is a graph comparing the volute and offset type casings in terms of the relationship flow area versus fluid path length and also showing the change in the profile of the graph of the offset type casing brought about by modification of the conventional cylindrical output nozzle to the converging spout outlet nozzle of the present invention.

The converging spout outlet nozzle 56 of the present invention of FIG. 5 has a loss coefficient approximately ten times less than that of the prior art cylindrical outlet nozzle 50 of FIG. 3. The flow area at the pump casing outlet nozzle is changed in the converging spout outlet nozzle 56 of the present invention from an abrupt one to a smoother one interfacing with the generally spherical casing body 24. FIG. 7 is a graph comparing the volute and offset type casings in terms of the relationship of flow area versus fluid path length. More importantly, however, FIG. 7 depicts the change from the abrupt to the smoother profile of the graph of the offset pump casing brought about by modification of the prior art cylindrical output nozzle 50 of FIG. 3 to the converging spout outlet nozzle 56 of the present invention of FIG. 5. The cone length L (FIG. 5) is adjustable in order to match the inlet area of the outlet nozzle 56 with the flow area F (FIG. 7) of the casing 24.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A nuclear reactor coolant pump for pumping reactor coolant fluid in a reactor coolant system, said pump comprising:
   (a) a casing defining an inlet nozzle for receiving a reactor coolant fluid, a converging spout outlet nozzle for discharging the reactor coolant fluid, and a passage interconnecting said inlet nozzle and said outlet nozzle through which the reactor coolant fluid can flow from said inlet nozzle to said outlet nozzle;
   (b) a rotor extending axially through said casing and having an end disposed adjacent said passage defined by said casing; and
   (c) an impeller mounted to said end of said rotor and disposed in communication with said passage, said impeller being rotatable with said rotor about an axis, said impeller being axially offset from said outlet nozzle for drawing fluid into said casing through said inlet nozzle and discharging fluid from said casing tangentially through said converging spout outlet nozzle after flow through said passage;
   (d) said converging spout outlet nozzle being composed of first and second wall portions defined above and below an imaginary plane extending generally parallel to said rotation axis of said impeller, said first wall portion extending substantially tangentially to said casing and having a substantially semi-cylindrical shape, said second wall portion having a combined substantially semi-elliptical and semi-conical shape.

2. The coolant pump as recited in claim 1, wherein an exit opening of said converging spout outlet nozzle has a substantially circular shape.

3. The coolant pump as recited in claim 1, wherein said semi-conical shape of said second wall portion defines a cone angle of less than approximately thirty degrees.

4. The coolant pump as recited in claim 1, wherein said semi-conical shape of said second wall portion defines a cone angle of approximately twenty-five degrees.

* * * * *